US010625778B2

(12) United States Patent
Buchwitz et al.

(10) Patent No.: US 10,625,778 B2
(45) Date of Patent: Apr. 21, 2020

(54) STEERABLE KNUCKLE APPARATUS AND RELATED METHODS

(71) Applicant: Ford Global Technologies, LLC, Dearborn, MI (US)

(72) Inventors: Joe L. Buchwitz, Huntington Woods, MI (US); John Wesley Stanley, Belleville, MI (US); Charles Krysztof, Canton, MI (US); James Adam Drozdowski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 15/698,334

(22) Filed: Sep. 7, 2017

(65) Prior Publication Data

US 2019/0071120 A1    Mar. 7, 2019

(51) Int. Cl.
| | | |
|---|---|---|
| *B62D 7/18* | (2006.01) | |
| *B60G 9/00* | (2006.01) | |
| *B60K 17/30* | (2006.01) | |
| *B60K 17/34* | (2006.01) | |
| *B60B 27/06* | (2006.01) | |

(52) U.S. Cl.
CPC .............. *B62D 7/18* (2013.01); *B60B 27/065* (2013.01); *B60G 9/00* (2013.01); *B60K 17/30* (2013.01); *B60K 17/306* (2013.01); *B60K 17/34* (2013.01); *B60G 2204/416* (2013.01); *B60G 2206/50* (2013.01); *B60Y 2200/141* (2013.01)

(58) Field of Classification Search
CPC ............... B62D 7/18; B60G 2299/422; B60G 2204/149; B60G 2206/50; F16D 2055/0008

USPC ...................................... 180/252; 280/93.512
See application file for complete search history.

(56) References Cited

U.S. PATENT DOCUMENTS

| | | | | |
|---|---|---|---|---|
| 3,420,327 | A * | 1/1969 | Nallinger .............. | B60K 17/046 180/255 |
| 3,940,159 | A * | 2/1976 | Pringle .................... | B62D 7/18 280/88 |
| 3,941,221 | A * | 3/1976 | Pringle ................... | B60T 1/065 188/218 XL |
| 4,037,680 | A * | 7/1977 | Grove .................. | B60K 17/306 180/254 |

(Continued)

FOREIGN PATENT DOCUMENTS

| | | | | |
|---|---|---|---|---|
| EP | | 1582438 A1 * | 10/2005 | ............... B60G 3/20 |
| WO | WO-2009089962 A1 * | | 7/2009 | ............. B60G 7/008 |

OTHER PUBLICATIONS

Kilcarr, "Hendrickson rolls out new tractor and trailer suspensions," Equipment content from Fleet Owner, http://fleetowner.com/equipment/hendricksonrollsoutnewtractorandtrailersuspensions, Mar. 27, 2014, 2 pages.

*Primary Examiner* — Ruth Ilan
(74) *Attorney, Agent, or Firm* — Ray Coppielle; Hanley, Flight & Zimmerman, LLC (57) ABSTRACT

Steerable knuckle apparatus and related methods are disclosed. An apparatus includes a steerable knuckle for a vehicle. The knuckle has a first portion to be movably coupled to a yoke of the vehicle and a second portion removably coupled to the first portion. The second portion receives a wheel hub of the vehicle. The apparatus also includes a first aperture disposed on the first portion to receive a first joint for movably coupling the knuckle to the yoke.

19 Claims, 10 Drawing Sheets

(56) References Cited

U.S. PATENT DOCUMENTS

| | | | | |
|---|---|---|---|---|
| 4,482,025 A | * | 11/1984 | Ehrlinger | B60B 27/04 180/254 |
| 4,618,159 A | * | 10/1986 | Kozyra | B60T 1/065 180/253 |
| 4,674,760 A | * | 6/1987 | Goulart | B62D 7/18 180/253 |
| 4,705,145 A | * | 11/1987 | Goulart | B60T 1/065 188/18 A |
| 4,722,540 A | * | 2/1988 | Kozyra | B60T 1/065 180/253 |
| 4,733,744 A | * | 3/1988 | Glaze | B60B 35/14 180/256 |
| 4,836,574 A | * | 6/1989 | Ingalls | B60G 7/005 280/86.756 |
| 5,120,150 A | * | 6/1992 | Kozyra | B60G 7/008 403/24 |
| 5,366,233 A | * | 11/1994 | Kozyra | B60T 1/065 280/93.512 |
| 5,435,590 A | * | 7/1995 | Larsson | B60G 3/00 180/257 |
| 5,785,332 A | | 7/1998 | Pollock et al. | |
| 5,865,275 A | * | 2/1999 | Anger | F16D 63/004 164/98 |
| 5,941,335 A | * | 8/1999 | Krisher | B60B 27/00 180/254 |
| 6,179,308 B1 | | 1/2001 | Mielauskas et al. | |
| 6,398,240 B1 | * | 6/2002 | Taylor | B60G 3/18 280/93.511 |
| 6,616,156 B1 | | 9/2003 | Dudding et al. | |
| 6,851,688 B2 | | 2/2005 | Barry | |
| 6,860,498 B2 | * | 3/2005 | McGaughy | B60G 7/008 280/93.51 |
| 6,902,176 B2 | | 6/2005 | Gottschalk | |
| 7,909,127 B1 | * | 3/2011 | Pionke | B60K 17/303 180/252 |
| 7,976,036 B2 | * | 7/2011 | Reid | B62D 7/18 180/252 |
| 8,118,133 B2 | * | 2/2012 | Armfield | B60B 35/001 180/255 |
| 8,844,669 B2 | * | 9/2014 | Armfield | B60B 35/001 180/255 |
| 2002/0089141 A1 | * | 7/2002 | Bennett | B60T 1/067 280/93.512 |
| 2005/0280229 A1 | * | 12/2005 | Ingalls | B62D 17/00 280/86.756 |
| 2014/0034431 A1 | * | 2/2014 | Chung | F16D 65/0075 188/73.31 |
| 2014/0197285 A1 | * | 7/2014 | Lucas | B60T 17/046 248/75 |
| 2017/0036693 A1 | * | 2/2017 | Reid | B62D 7/18 |
| 2017/0217493 A1 | * | 8/2017 | Byrne | B62D 17/00 |
| 2018/0126782 A1 | * | 5/2018 | Sinka | B60B 27/0052 |
| 2018/0319211 A1 | * | 11/2018 | Yang | B60B 27/001 |
| 2019/0061455 A1 | * | 2/2019 | Buchwitz | B60G 11/04 |

* cited by examiner

STEERABLE KNUCKLE APPARATUS AND RELATED METHODS

FIELD OF THE DISCLOSURE

This disclosure relates generally to vehicles and, more particularly, to steerable knuckle apparatus and related methods.

BACKGROUND

Vehicle suspension systems may implement steering knuckles to provide steering to a vehicle. Typically, vehicle front wheels each include a knuckle interposed between the wheel and the vehicle chassis. In particular, a tie rod and a joint (e.g., a king pin, a ball joint, etc.) enable each knuckle to pivot in response to driver input (e.g., via a steering wheel), thereby changing a steering angle of the front wheels.

SUMMARY

An apparatus disclosed herein includes a steerable knuckle for a vehicle. The knuckle has a first portion to be movably coupled to a yoke of the vehicle and a second portion removably coupled to the first portion. The second portion receives a wheel hub of the vehicle. The apparatus also includes a first aperture disposed on the first portion to receive a first joint for movably coupling the knuckle to the yoke.

Another apparatus includes a vehicle having a steerable knuckle. A first portion of the knuckle is movably coupled to a yoke of the vehicle and a second portion of the knuckle is removably coupled to the first portion. The first portion of the knuckle includes a first arm and a second arm defining a first aperture to receive first means for movably coupling the knuckle to the yoke. The first arm and the second arm extend away from the first aperture to engage the second portion of the knuckle.

A method includes aligning a first aperture of a first portion of a steerable knuckle of a vehicle to a second aperture of a yoke of the vehicle. The method also includes movably coupling the first portion of the knuckle to the yoke via a ball joint. The method also includes disposing a joint of an axle of the vehicle in a third aperture of the first portion of the knuckle. The method also includes coupling a second portion of the knuckle to the first portion.

The figures are not to scale. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Some vehicle suspension systems implement steering knuckles to provide steering to rear wheels as well as front wheels (i.e., all-wheel steering), which improves vehicle handling, vehicle maneuverability, and/or may enable a vehicle control module to provide advanced steering features. However, known steering knuckles are not compatible with certain vehicle hardware and/or may cause significant problems when implemented in certain vehicles. For example, a truck typically includes a parking brake (e.g., a drum-in-hat (DIH) parking brake) that is assembled with an axle (e.g., a rear and/or solid axle) of the truck. In such examples, the steering knuckles have a relatively small central bore sized according to the parking brake and/or components of the parking brake. In other examples, the bore may be sized according to a wheel hub or bearing pilot. As a result, a universal joint (i.e., a U-joint) and/or a constant velocity joint (i.e., a CV-joint) of the axle interferes with the bore of the above known knuckles and/or is too large pass through the bore. Additionally, the universal joint and/or the constant velocity joint limit access to one or more ball joints of these known steering knuckles. Still further, a leaf spring and/or components associated with the leaf spring may further limit or restrict access to the ball joint(s). The above-noted issues associated with these known knuckles can lead to difficulty in assembling or servicing the axle.

Steerable knuckle apparatus and related methods are disclosed herein. Examples disclosed herein provide a steerable knuckle for a vehicle (e.g., a truck, a car, a van, etc.) having a first portion and a second portion. In some disclosed examples, the first portion of the knuckle movably couples to a yoke of the vehicle (e.g., via one or more ball joints), and the second portion of the knuckle removably couples to the first portion (e.g., via one or more fasteners). By enabling the second portion of the knuckle to removably couple to the first portion, disclosed examples facilitate assembly and/or disassembly of an axle (e.g., a front axle and/or a rear axle) of the vehicle and/or associated components (e.g., a universal joint, a constant velocity joint, a parking brake, a brake rotor, a brake caliper, etc.) while reducing and/or eliminating problems that would have otherwise been caused by using the above-noted known knuckles. In some disclosed examples, the first portion of the knuckle includes a significantly large aperture to receive a universal joint and/or a constant velocity joint (i.e., allow the joint(s) to pass through the aperture) of the axle, for example, when the second portion is removed from the first portion. Further, in some disclosed examples, the second portion of the knuckle is sized in accordance with and/or receives a parking brake (e.g., a DIH parking brake) of the vehicle, which enables the second portion and the parking brake to be coupled to the first portion.

The first portion of the disclosed steerable knuckle includes at least a first aperture associated with a second aperture of the yoke, each of which receives a portion of a joint (e.g., a ball joint) for movably coupling the knuckle to the yoke. In some disclosed examples, the first portion of the knuckle includes a first arm and a second arm defining the first aperture. In such examples, the first arm and the second arm each extend along an axis of the first aperture to define a respective mating surface and/or engage the second portion of the knuckle when the second portion is coupled to the first portion. In such examples, one of the first arm or the second arm includes a steering arm or extension extending radially outward relative to the first aperture and/or the second aperture to receive means for steering the vehicle (e.g., a tie rod), thereby causing the knuckle to rotate and/or pivot relative to the joint(s), for example, in response to driver input (e.g., via a steering wheel).

Additionally or alternatively, in some examples, the second arm of the first portion of the knuckle includes a stepped profile partially defining the mating surface of the first portion. In such examples, the stepped profile includes a recessed area adjacent the mating surface to receive one or more components associated with actuating the parking brake of the vehicle, such as a cable abutment. For example, the second portion of the knuckle includes the cable abutment to receive a brake wire or cable for actuating the parking brake, for example, in response to a driver actuating a parking brake of the vehicle. In such examples, the cable abutment is positioned in the recessed area of the stepped profile of the second arm when the second portion is coupled to the first portion. In some examples, the second portion of the knuckle includes the cable abutment as well as hardware (e.g., one or more fasteners) to enable the second portion to receive the parking brake, which reduces tolerance variability and/or maximizes structural integrity.

The second portion of the disclosed steerable knuckle receives at least the wheel hub or bearing of the vehicle. In some examples, the second portion includes a cylindrical portion at least partially defining an aperture of the second portion and an annular surface to engage the wheel hub of the vehicle. In such examples, the aperture of the second portion receives at least a portion of the wheel hub when the wheel hub is coupled to the second portion. Further, as disclosed above, the second portion of the knuckle may also receive the parking brake of the vehicle. In such examples, the second portion of the knuckle includes a mating surface adjacent and/or surrounding the cylindrical portion to engage the parking brake and/or a dust shield of the parking brake. Further, in some disclosed examples, the second portion of the knuckle also receives a brake caliper of the vehicle. In such examples, the second portion of the knuckle includes at least a flange portion extending away relative to the second portion to engage the brake caliper of the vehicle and/or the first portion. Thus, some disclosed examples enable the second portion of the knuckle to receive and/or carry one or more (e.g., each) of the wheel hub of the vehicle, the parking brake of the vehicle, a brake rotor of the vehicle, and/or the brake caliper of the vehicle.

Figure 1:
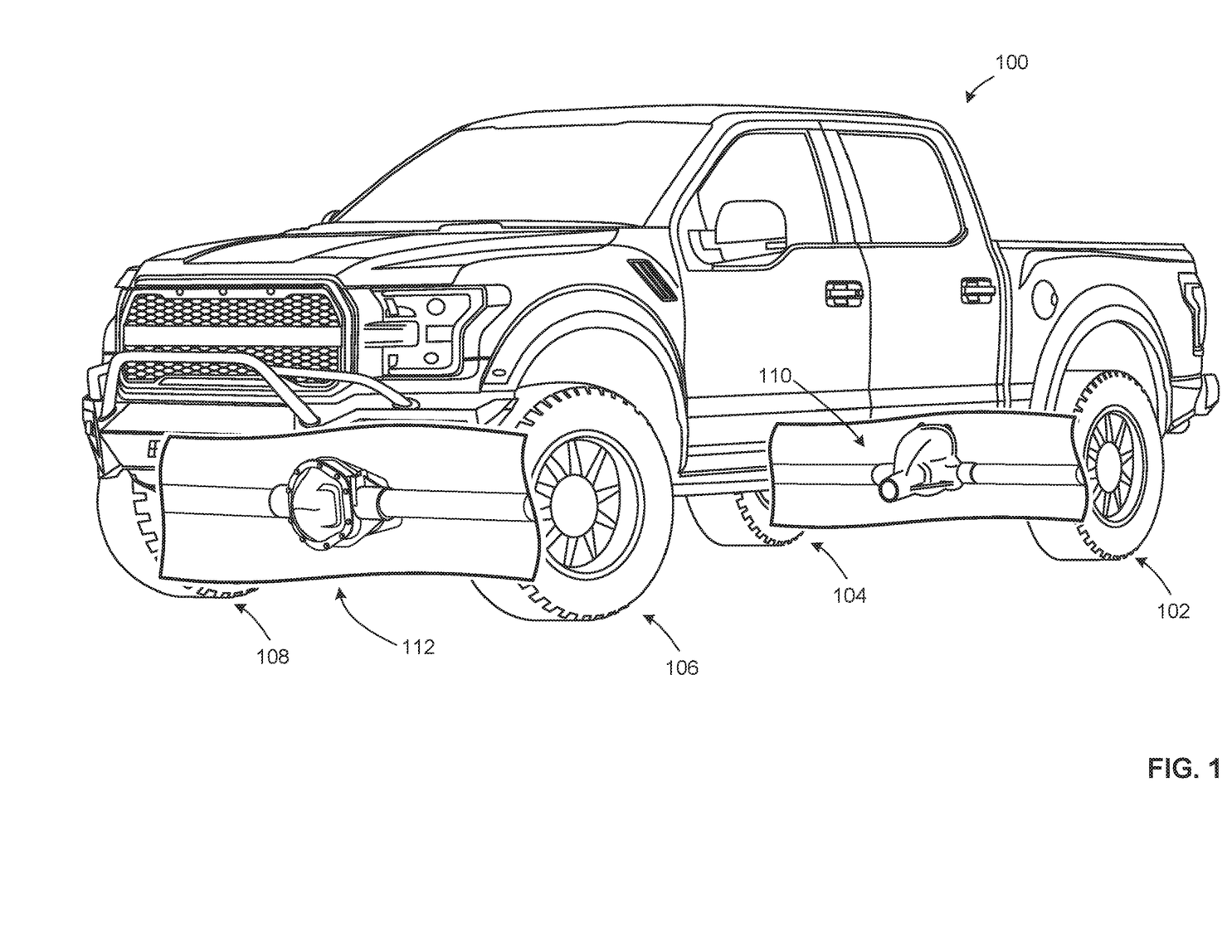
FIG. 1 is a schematic illustration of an example vehicle that may implement the teachings of this disclosure.

FIG. 1 is a schematic illustration of an example vehicle 100 that may implement the teachings of this disclosure. The example vehicle 100 of FIG. 1 can be a truck, a car, a van, etc. having one or more wheels. In this example, the vehicle includes a first wheel 102 (e.g., a left side rear wheel), a second wheel 104 (e.g., a right side rear wheel), a third wheel 106 (e.g., a left side front wheel), and a fourth wheel 108 (e.g., a right side front wheel). While the four wheels 102, 104, 106, 108 are depicted in FIG. 1, in other examples, the vehicle 100 can include additional or fewer wheels.

In the example of FIG. 1, the first wheel 102 and the second wheel 104 are coupled to and/or are associated with a first axle (e.g., a rear axle) 110 of the vehicle 100. The first axle 110 of FIG. 1 is a solid axle (i.e., a dependent axle or suspension design). However, in other examples, the first axle 110 may be an independent axle or suspension design. Similarly, the third wheel 106 and the fourth wheel 108 are coupled to and/or are associated with a second axle (e.g., a front axle) 112 of the vehicle 100, which is also a solid axle in this example.

Figure 2:
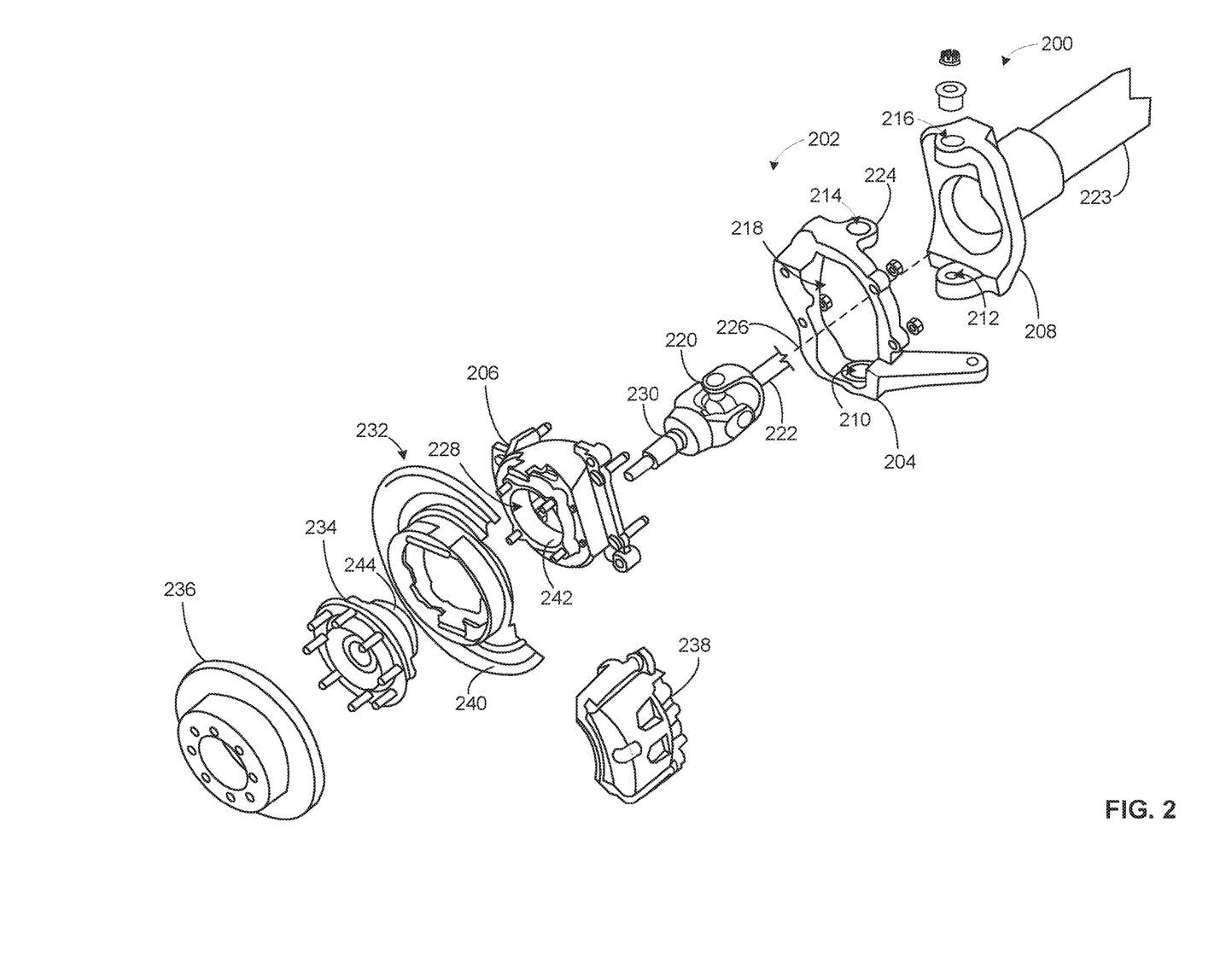
FIG. 2 is an exploded-view of an example axle assembly and an example steerable knuckle in accordance with examples disclosed herein.

FIG. 2 is an exploded-view of an example axle assembly 200 and an example steerable knuckle 202 in accordance with the teachings of this disclosure. The example axle assembly 200 and/or the steerable knuckle 202 of FIG. 2 can be implemented in a vehicle such as, for example, the example vehicle 100 of FIG. 1. In the example of FIG. 1, the example axle assembly 200 is depicted as a solid axle and/or dependent suspension design. However, in other examples, the axle assembly 200 may be an independent suspension design.

According to the illustrated example, the steerable knuckle 202 includes a first portion 204 and a second portion 206. The first portion 204 of the knuckle 202 is to be movably coupled to a yoke 208 of a vehicle and the second portion 206 of the knuckle 202 is to be removably coupled to the first portion 204. The first portion 204 of the knuckle 202 includes a first aperture 210 associated with a second aperture 212 of the yoke 208. In particular, first means for movably coupling the knuckle to the yoke 208 is to be at least partially disposed in the first aperture 210 of the first portion 204 and the second aperture 212 of the yoke 208. In some examples, the first portion 204 includes a third aperture 214 spaced from the first aperture 210, which is shown in FIG. 2. In such examples, the third aperture 214 is associated with a fourth aperture 216 of the yoke 208. In particular, second means for movably coupling the knuckle 202 to the yoke 208 is to be at least partially disposed in the third aperture 214 of the first portion 204 and the fourth aperture 216 of the yoke 208.

According to the illustrated example, means for movably coupling (e.g., the above disclosed first means for movably coupling and/or the second means for movably coupling) the steerable knuckle 202 to the yoke 208 includes one or more of a joint (e.g., a ball joint) and/or another structure that couples the knuckle 202 to the yoke 208 while enabling the knuckle 202 to rotate and/or pivot relative to the yoke 208.

In the example of FIG. 2, the first portion 204 of the knuckle 202 includes a fifth aperture 218 adjacent the first aperture 210 to receive a joint (e.g., a universal joint or a constant velocity joint) 220. The joint 220 of FIG. 2 is coupled to a shaft or axle 222 and is to be at least partially disposed in the fifth aperture 218 and between the second aperture 212 and the fourth aperture 216 of the yoke 208 when the first portion 204 is movably coupled to the yoke 208. The axle 222 of FIG. 2 is to be positioned in an axle tube 223, for example, after the first portion 204 of the knuckle 202 is movably coupled to the yoke 208. As shown in FIG. 2, the fifth aperture 218 of the first portion 204 is oblong and positioned between the first aperture 210 and the third aperture 214. The first portion 204 of the knuckle 202 includes a boss 224 extending away relative to the first portion 204 along a central axis 226 of the fifth aperture 218, and the third aperture 214 of the first portion 204 extends through the boss 224.

In the example of FIG. 2, the second portion 206 of the knuckle 202 includes a sixth aperture 228 to receive a spline or stub shaft 230 of the axle 222. In some examples, the second portion 206 of FIG. 2 partially covers the fifth aperture 218 of the first portion 204 when coupled to the first portion 204. In such examples, the sixth aperture 228 of the second portion 206 is significantly smaller than the fifth aperture 218 of the first portion 204, as shown in FIG. 2.

In the illustrated example, the second portion 206 of the knuckle 202 is to removably couple to the first portion 204, a parking brake 232, a wheel bearing or hub 234, a brake rotor 236, and/or a brake caliper 238, which is disclosed in greater detail below in connection with FIG. 3. In the example of FIG. 2, the parking brake 232 is a DIH parking brake and includes a dust shield 240. In such examples, the sixth aperture 228 of the second portion 206 may be sized in accordance with the parking brake 232 and/or the wheel hub 234, for example, such that an inner wall 242 of the sixth aperture 228 is proximate to and/or engages an outer surface 244 of the wheel hub 234 when the second portion 206 receives the wheel hub 234.

Figure 3:
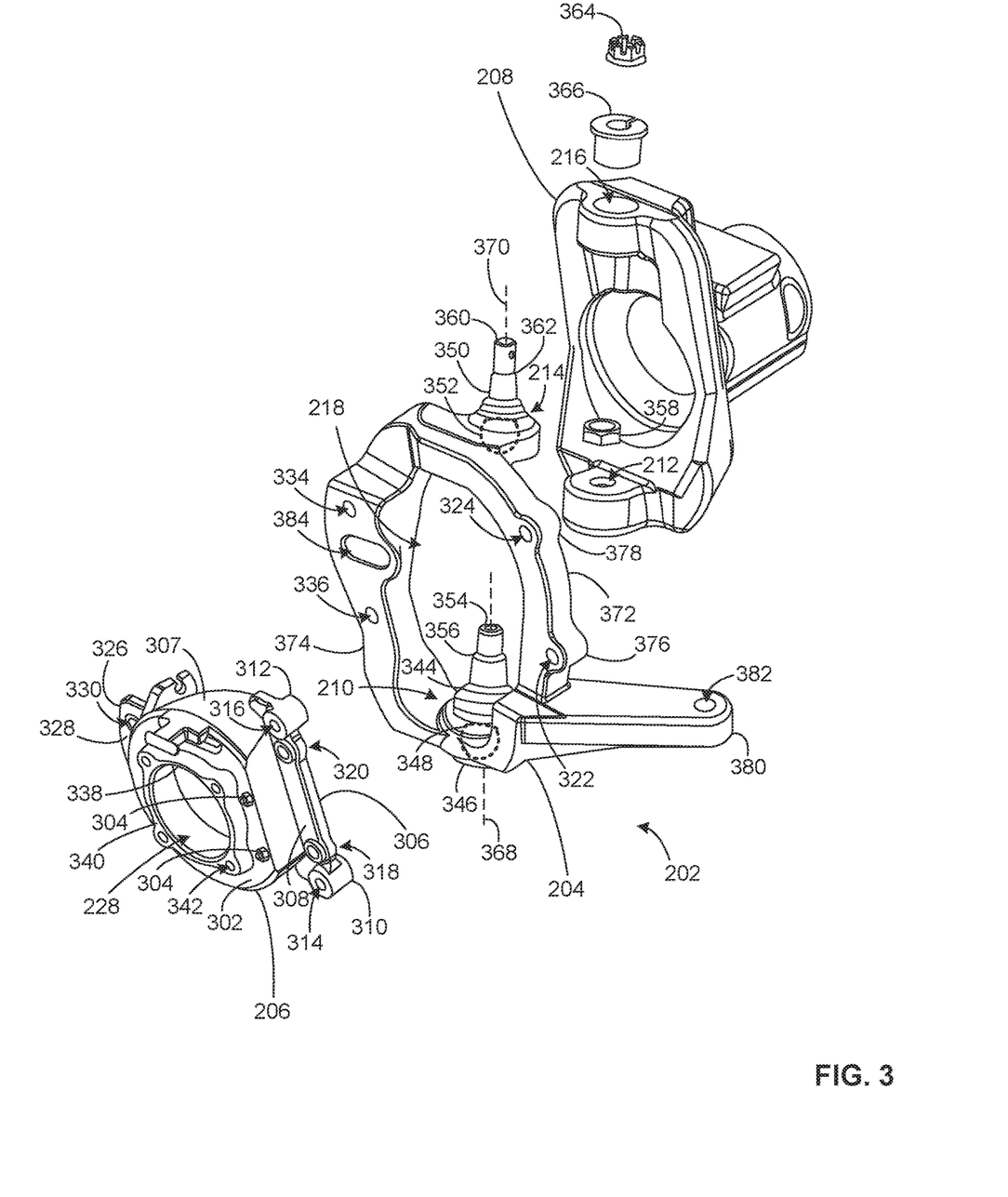
FIG. 3 is an enlarged view of the example steerable knuckle of FIG. 2.

FIG. 3 is an enlarged view of the example steerable knuckle 202 and yoke 208 of FIG. 2. As disclosed above, the second portion 206 of the knuckle 202 removably couples to the parking brake 232 in some examples. In such examples, the second portion 206 of the knuckle 202 includes a mating surface 302 to receive and/or engage the parking brake 232. The mating surface 302 of FIG. 3 is adjacent and/or surrounds the sixth aperture 228 of the second portion 206. In this example, the mating surface 302 of the second portion 206 includes one or more fasteners (e.g., a nut, a bolt, a pin, etc.) 304 for fastening the parking brake 232 and/or the dust shield 240 to the second portion 206. While two fasteners 304 of the mating surface 302 are shown in FIG. 3, additional or fewer fasteners 304 may be used in other examples.

In the example of FIG. 3, the second portion 206 of the knuckle 202 includes a first flange or mounting portion 306 disposed on an outer surface (e.g., an outer circumferential surface) 307 of the second portion 206 and extending away relative to the outer surface 307 to receive the brake caliper 238 and/or the first portion 204 of the knuckle 202. In particular, the first flange 306 defines a surface 308 between a pair of bosses 310, 312, each of which has a respective aperture 314, 316 disposed thereon to receive means for fastening the second portion 206 of the knuckle 202 to the brake caliper 238. For example, the means for fastening includes one or more of a pin, a bolt, a stud, a nut, etc. While the surface 308 of the first flange 306 of the second portion 206 of FIG. 3 is depicted as having the pair of bosses 310, 312 and/or the respective apertures 314, 316, in other examples, the surface 308 includes fewer or additional bosses and/or respective apertures.

In the example of FIG. 3, the surface 308 of the first flange 306 includes a first pair of apertures 318, 320, each of which is to receive a means for fastening the second portion 206 of the knuckle 202 to the first portion 204. For example, the means for fastening includes one or more of a pin, a bolt, a stud, a nut, etc. In such examples, the first portion 204 of the knuckle 202 includes a second pair of apertures 322, 324 that correspond to and/or are to align with the first pair of aperture 318, 320 and receive the means for fastening. While the surface 308 of the first flange 306 of the second portion 206 of FIG. 3 is depicted as having the first pair of apertures 318, 320, in other examples, the surface 308 of the first flange 306 includes fewer or additional apertures. Similarly, in other examples, the first portion 204 of the knuckle 202 of FIG. 3 includes fewer or additional apertures other than the second pair of apertures 322, 324 shown in FIG. 3.

In the example of FIG. 3, the second portion 206 of the knuckle 202 includes a second flange or mounting portion 326 disposed on the outer surface 307, opposite the first flange 306, and extending away relative to the outer surface 307 and/or the first flange 306 to receive the first portion 204 of the knuckle 202. In particular, the second flange 326 defines a surface 328 having a third pair of apertures 330 disposed thereon, only one of which is shown in FIG. 3. Each of the third pair of apertures 330 receives the means for fastening the second portion 206 of the knuckle 202 to the first portion 204. In such examples, the first portion 204 of the knuckle 202 includes a fourth pair of apertures 334, 336 that correspond to and/or are to align with the third pair of aperture 330 and receives the means for fastening. While the surface 328 of the second flange 326 of the second portion 206 of FIG. 3 is depicted having the third pair of apertures 330, in other examples, the surface 328 of the second flange 326 includes fewer or additional apertures. Similarly, in other examples, the first portion 204 of the knuckle 202 of FIG. 3 includes fewer or additional apertures other than the fourth pair of apertures 334, 336 shown in FIG. 3.

In the example of FIG. 3, the second portion 206 of the knuckle 202 receives the wheel bearing or hub 234 (FIG. 2). For example, at least a portion of the wheel hub 234 is to be disposed in the sixth aperture 228 of the second portion 206 to receive the stub shaft 230. In particular, the second portion 206 includes a cylindrical portion 338 at least partially defining the sixth aperture 228 of the second portion 206 and extending away relative to the mating surface 302 to define an annular mating surface 340 to engage the wheel hub 234. In some examples, one or more recesses 342 are disposed on the annular mating surface 340. In this example, the annular mating surface 340 includes four recesses 342 distributed radially relative to the annular mating surface 340. However, in other examples, the annular mating surface 340 includes additional or fewer recesses 342. In any case, one or more of the recesses 342 of the cylindrical portion 338 receive means for coupling the second portion 206 of the knuckle 202 to the wheel hub 234 such as, for example, a pin or bolt.

As shown in FIG. 3, a first ball joint 344 extends through the first aperture 210 of the first portion 204 of the knuckle 202 to expose a first end 346 of the first ball joint 344. In particular, a first ball stud 348 of the first ball joint 344 is at least partially disposed in the first aperture 210. Similarly, in this example, a second ball joint 350 extends through the third aperture 214 of the first portion 204 to expose a first end 406 (shown in FIG. 4) of the second ball joint 350. As such, a second ball stud 352 of the second ball joint 350 is at least partially disposed in the third aperture 214 of the first portion 204 of the knuckle 202.

The first ball joint 344 of FIG. 3 is also to extend through the second aperture 212 of the yoke 208 to expose a second end 354 of the first ball joint 344, opposite the first end 346, for example, when the first portion 204 of the knuckle 202 is movably coupled to the yoke 208. In particular, a portion (e.g., a threaded portion and/or a tapered portion) 356 of the first ball joint 344 is to be positioned in the second aperture 212 of the yoke 208. In such examples, a first fastener (e.g., a hex nut, a castle nut, etc.) 358 is to be disposed on the second end 354 of the first ball joint 344, thereby coupling the first ball joint 344 to the yoke 208 and/or movably coupling the first portion 204 of the knuckle 202 to the yoke 208. In this example, the first fastener 358 is a hex nut. Similarly, in the illustrated example, the second ball joint 350 is to extend through the fourth aperture 216 of the yoke 208 to expose a second end 360 of the second ball joint 350, opposite the first end 406. In particular, a portion (e.g., a threaded portion and/or a tapered portion) 362 of the second ball joint 350 is positioned in the fourth aperture 216 of the yoke 208. In such examples, a second fastener 364 is to be disposed on the second end 360 of the second ball joint 350, thereby coupling the second ball joint 350 to the yoke 208 and/or movably coupling the first portion 204 of the knuckle 202 to the yoke 208. In this example, the second fastener 364 is a castle nut. By movably coupling the knuckle 202 to the yoke 208 via the first ball joint 344 and the second ball joint 350, stability and/or performance of the knuckle 202 is improved (e.g., during normal vehicle use).

While the first fastener 358 of FIG. 3 is depicted as a hex nut, in other examples, the first fastener 358 may be a different fastener. Similarly, while the second fastener 364 of FIG. 3 is depicted as a castle nut, in other examples, the second fastener 364 may be a different fastener.

In the example of FIG. 3, a bushing or slug 366 (i.e., a ball joint and/or an alignment slug) is to be disposed in the fourth aperture 216 of the yoke 208 to receive the second ball joint 350, which enables the second ball joint 350 to be easily positioned and/or secured within the third aperture 214 of the first portion 204 of the knuckle 202 and/or the fourth aperture 216 of the yoke 208. Further, the slug 366 facilitates assembly of the knuckle 202 and the yoke 208 when using the first ball joint 344 and/or the second ball joint 350. In some examples, the slug 366 provides different camber and/or caster angles for the steerable knuckle 202, which is disclosed in greater detail below in connection with FIGS. 5A-C.

In this example, the slug 366 is to be positioned in an uppermost (in the orientation of FIG. 3) portion of the fourth aperture 216 of the yoke 208 to receive the portion 362 of the second ball joint 350, which is shown in FIG. 3. In such examples, the fourth aperture 216 of the yoke 208 is significantly larger than the second aperture 212 of the yoke 208. In other examples, the slug 366 is to be positioned in a lowermost (in the orientation of FIG. 3) portion of the fourth aperture 216 of the yoke 208, which is disclosed in greater detail below in connection with FIG. 4.

In the example of FIG. 3, a first axis 368 of the first aperture 210 of the first portion 204 of the knuckle 202 is substantially parallel relative to a second axis 370 of the third aperture 214 of the first portion 204. For example, an angle formed by the first axis 368 and the second axis 370 is between 0 degrees and 15 degrees. In this example, the first aperture 210 and the third aperture 214 are positioned substantially along the same axis. According to FIG. 3, the steerable knuckle 202 and/or the first portion 204 is to rotate and/or pivot relative to the first axis 368 and/or the second axis 370, thereby changing a steering angle of a wheel (e.g., one or more of the wheels 102, 104, 106, 108 of FIG. 1) and/or providing steering to the vehicle (e.g., in response to input from a driver and/or controller of the vehicle).

As shown in FIG. 3, the first portion 204 of the knuckle 202 includes a first arm 372 and a second arm 374 defining the first aperture 210. The first arm 372 and/or the second arm 374 extend away from the first aperture 210 (e.g., along the first axis 368 and/or the second axis 370) to engage the second portion 206 of the knuckle 202. Further, in this example, the first arm 372 and the second arm 374 extend away from the first aperture 210 to at least partially define the third aperture 214 and/or the fifth aperture 218 of the first portion 204 of the knuckle 202, which is shown in FIG. 3. In this example, the first arm 372 includes a pair of bosses 376, 378, each of which extends radially outward relative to the first aperture 210 and/or the third aperture 214 of the first portion 204 of the knuckle 202 to at least partially define a respective one of the second pair of apertures 322, 324 of the first portion 204. The second arm 374 of FIG. 3 includes the fourth pair of apertures 334, 336 of the first portion 204 of the knuckle 202 in this example.

In the example of FIG. 3, the first portion 204 of the knuckle 202 includes a third arm 380 extending radially outward relative to the first aperture 210 to engage means for steering the vehicle. The means for steering the vehicle includes one or more of a tie rod, a cable, and/or one or more other structures that cause the knuckle 202 to move relative to the yoke 208. For example, when a driver rotates a steering wheel of the vehicle, the means for steering the vehicle 100 moves toward and away from the yoke 208, thereby causing the knuckle 202 to rotate and/or pivot relative to the first axis 368 of the first aperture 210 and/or the second axis 370 of the third aperture 214. As shown in FIG. 3, the third arm 380 includes an aperture 382 to receive the means for steering the vehicle. In this example, the third arm 380 is disposed on the first arm 372 adjacent the first aperture 210 of the first portion 204 and extends radially outward relative to the first aperture 210 and/or the third aperture 214. In other examples, the third arm 380 may be likewise adjacent the third aperture 214 and/or disposed on the second arm 374.

Additionally or alternatively, in some examples, the first portion 204 of the knuckle 202 includes a seventh aperture 384 to receive a sensor 704, which is disclosed in greater detail below in connection with FIG. 7. In this example, the seventh aperture 384 is disposed on the second arm 374 of the first portion 204 of the knuckle 202.

Figure 4:
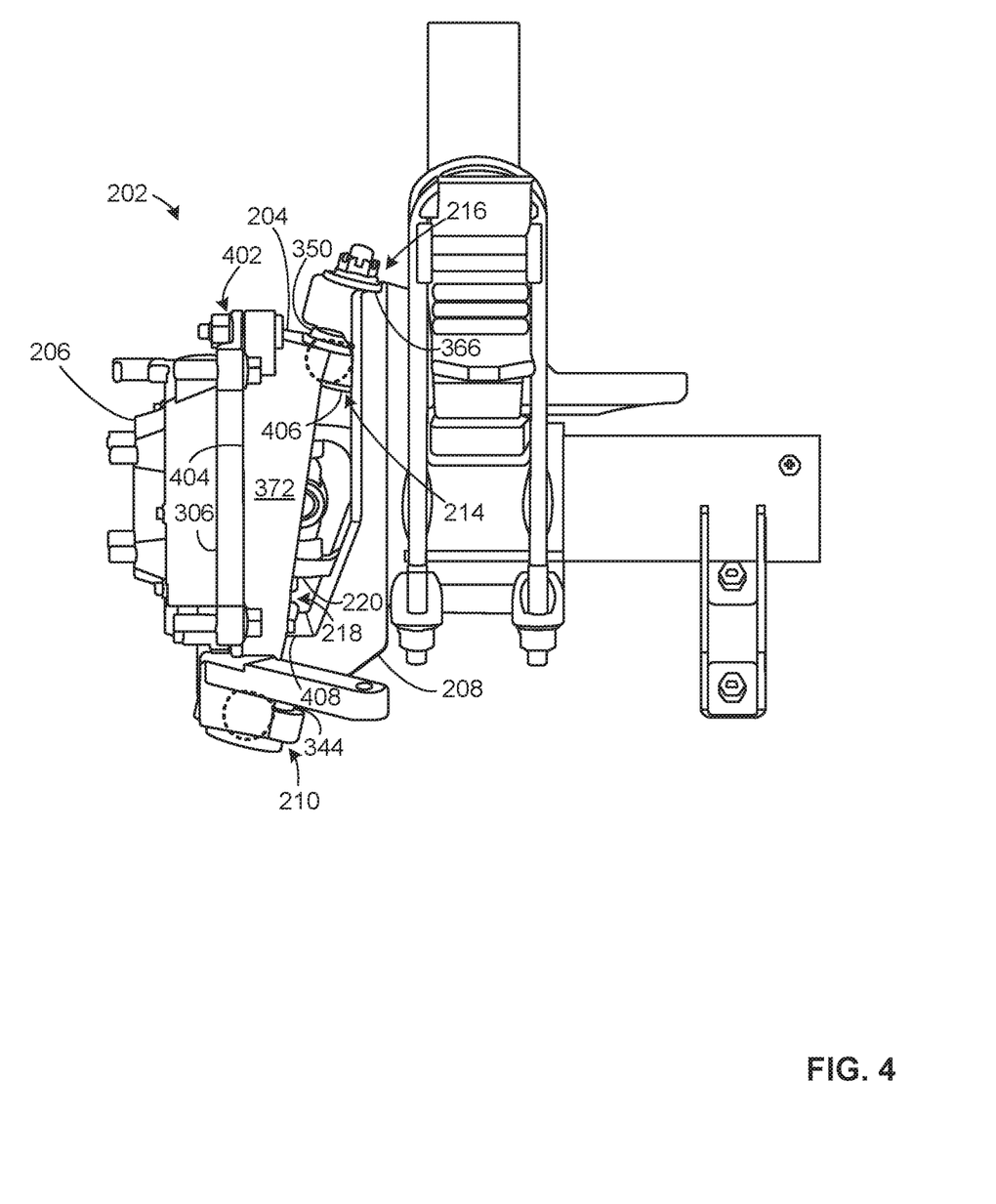
FIG. 4 is a rear-view of the example steerable knuckle of FIG. 2.

FIG. 4 is a rear-view of the example steerable knuckle 202 of FIG. 2 and shows the first portion 204 of the knuckle 202 movably coupled to the yoke 208 and the second portion 206 of the knuckle 202 removably coupled to the first portion 204. In the example of FIG. 4, the first flange 306 of the second portion 206 of the knuckle 202 includes a recessed area 402 (e.g., disposed on the surface 308 of the first flange 306) defining at least one of the above disclosed first pair of apertures 318, 320 of the first flange 306.

In the example of FIG. 4, the first portion 204 (e.g., the first arm 372 and/or the second arm 374) of the knuckle 202 includes a mating surface (e.g., a flat or level surface) 404 extending the length of the second portion 206 of the knuckle 202 and/or engaging the first flange 306 of the second portion 206. As shown in FIG. 4, the first arm 372 of the first portion 204 includes the mating surface 404. In some examples, the mating surface 404 of the first portion 204 of the knuckle 202 extends only along a portion of the length of the second portion 206. For example, the second arm 374 of the first portion 204 includes a stepped profile, which is disclosed in greater detail below in connection with FIG. 6.

As shown in FIG. 4, the joint 220 of the axle 222 is positioned between and/or proximate to the first ball joint 344 and the second ball joint 350. As disclosed above, the second ball joint 350 extends through the third aperture 214 of the first portion 204 to expose the first end 406 of the second ball joint 350, which is shown in FIG. 4.

As shown in FIG. 4, at least a portion 408 of the yoke 208 is disposed in the fifth aperture 218 of the first portion 204 (e.g., between the first arm 372 and the second arm 374) of the knuckle 202 and/or between the first aperture 210 and the third aperture 214 of the first portion 204. In this example, the joint 220 of the axle 222 is at least partially disposed in the fifth aperture 218. Additionally or alternatively, in this example, the first ball joint 344 and/or second ball joint 350 is/are at least partially disposed in the fifth aperture 218 and/or between the first arm 372 and the second arm 374 of the first portion 204. Further, in some examples, the first ball joint 344 and/or second ball joint 350 is/are at least partially disposed between the first aperture 210 and the third aperture 214 of the first portion 204 of the knuckle 202.

In this example, the third aperture 214 of the first portion 204 of the knuckle 202 is positioned below (in the orientation of FIG. 4) the fourth aperture 216 of the yoke 208. As such, the slug 366 is disposed in the uppermost (in the orientation of FIG. 4) portion of the fourth aperture 216 of the yoke 208, which is shown in FIG. 4. Additionally or alternatively, in other examples, the third aperture 214 of the first portion 204 may be positioned above (in the orientation of FIG. 4) the fourth aperture 216 of the yoke 208. In such examples, the slug 366 is disposed in the lowermost (in the orientation of FIG. 4) portion of the fourth aperture 216 of the yoke 208 instead of the uppermost (in the orientation of FIG. 4) portion of the second aperture 212.

Figure 5A:
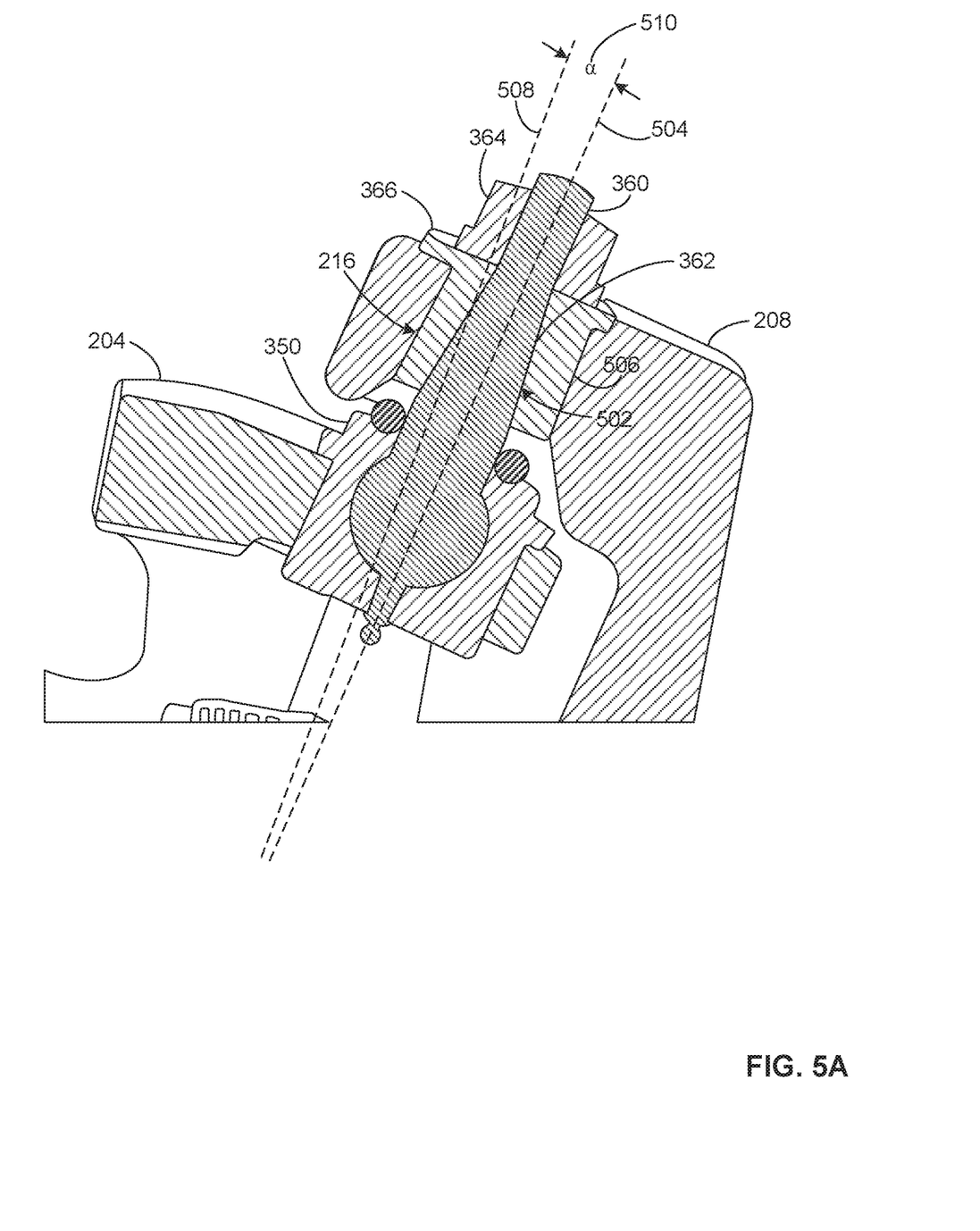
FIGS. 5A-C are partial cross-sectional views of the example steerable knuckle of FIG. 2.
Figure 5B:
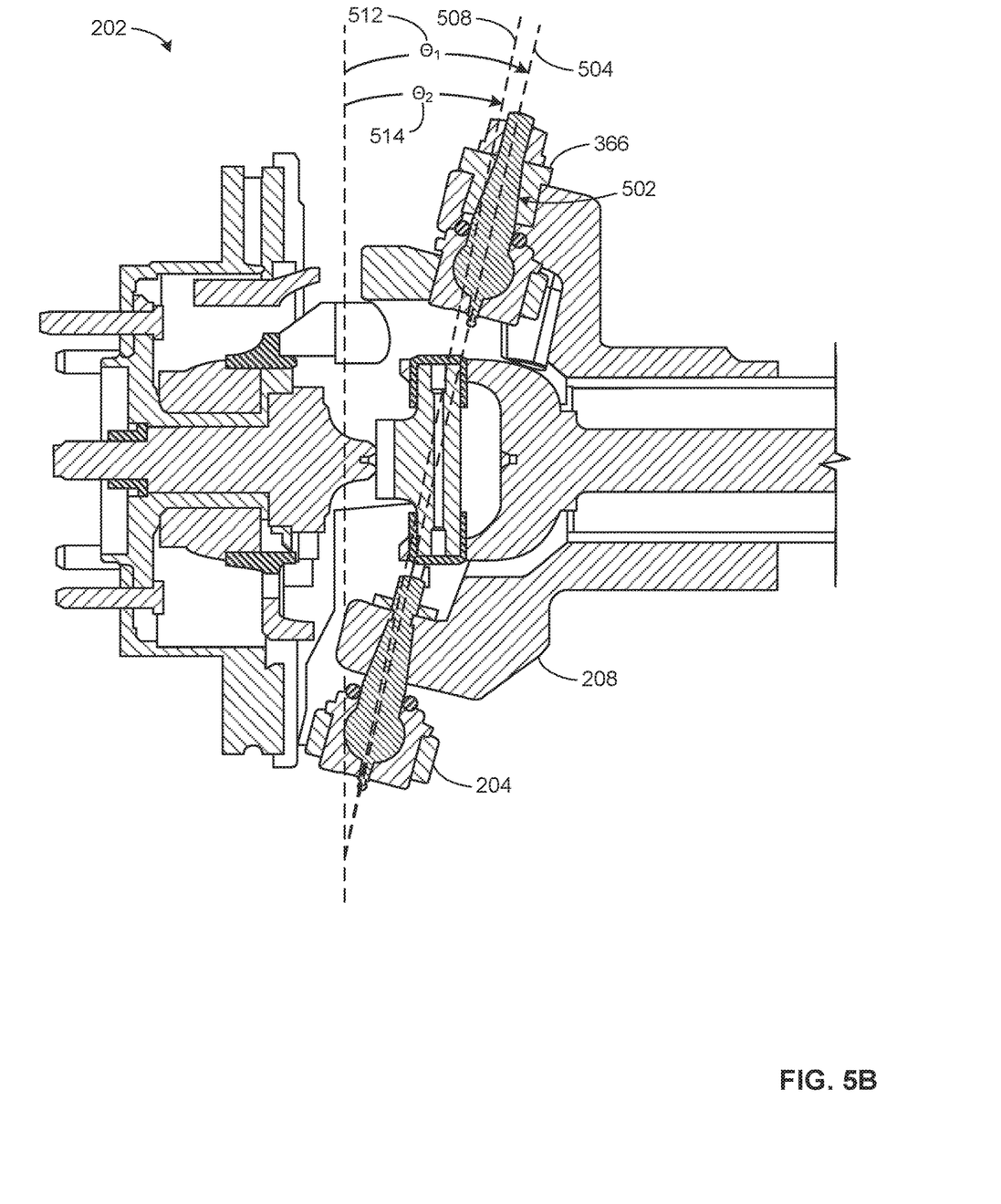
Figure 5C:
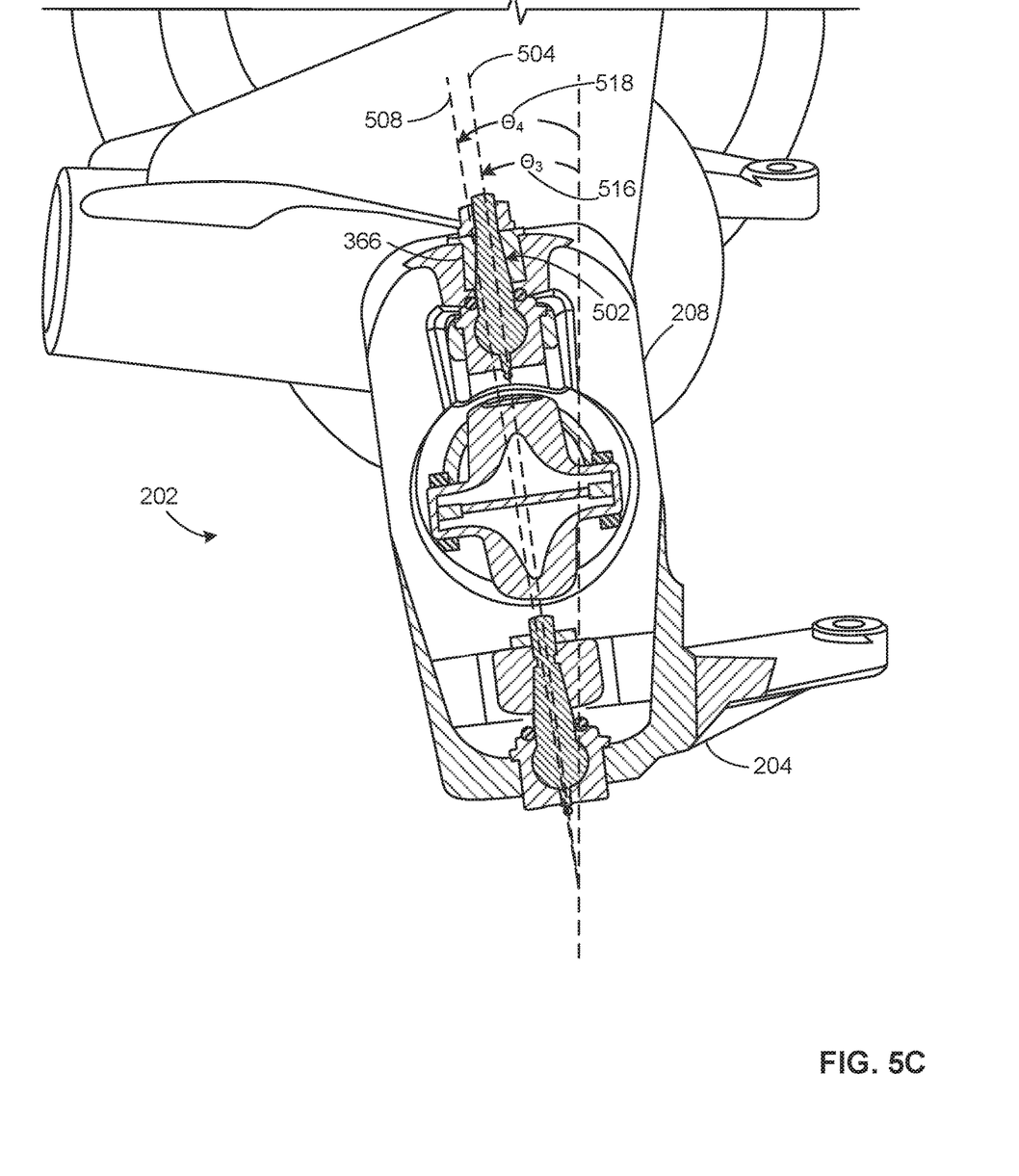

FIGS. 5A-C are partial cross-sectional views of the first portion 204 of the example steerable knuckle 202 and the yoke 208 of FIG. 2 and shows the first portion 204 movably coupled to the yoke 208. In the example of FIG. 5A, the slug 366 is positioned in the fourth aperture 216 of the yoke 208 interposed between the yoke 208 and the second ball joint 350. In this example, the portion 362 of the second ball joint 350 extends through the slug 366, and the second fastener 364 is disposed on the second end 360 of the second ball joint 350.

As shown in FIG. 5A, the slug 366 includes an aperture 502 to receive the second ball joint 350. In this example, the aperture 502 extends along a first axis 504 relative to the slug 366. The first axis 504 of FIG. 5A is centrally disposed on the slug 366 and substantially parallel relative to an outer surface (e.g., a circumferential surface) 506 of the slug 366. In other examples, the aperture 502 of the slug 366 extends along a different axis that may be offset relative to the first axis 504 and/or non-parallel relative to the outer surface 506, which facilitates different caster and/or camber angles for the steerable knuckle 202. For example, the aperture 502 of the slug 366 may extend along a second axis 508 relative the slug 366, which is shown in FIG. 5A. In this example, the second axis 508 is substantially non-parallel relative to the outer surface 506 of the slug 366 and/or forms an angle 510 with the first axis 504.

As shown in FIG. 5B, the slug 366 facilitates different camber angles for the steerable knuckle 202. In this example, the aperture 502 of the slug 366 extends along the first axis 504 to provide a first camber angle 512 of the steerable knuckle 202. In some examples, the slug 366 facilitates one or more other camber angles for the steerable knuckle 202 less than or greater than the first camber angle 512. For example, the aperture 502 of the slug 366 may extend along the second axis 508 to provide a second camber angle 514 of the steerable knuckle 202.

As shown in FIG. 5C, the slug 366 facilitates different caster angles for the steerable knuckle 202. In this example, the aperture 502 of the slug 366 extends along the first axis 504 to provide a first caster angle 516 of the steerable knuckle 202. In some examples, the slug 366 facilitates one or more other caster angles less than or greater than the first caster angle 516. For example, the aperture 502 of the slug 366 may extend along the second axis 508 to provide a second caster angle 518 of the steerable knuckle.

Figure 6:
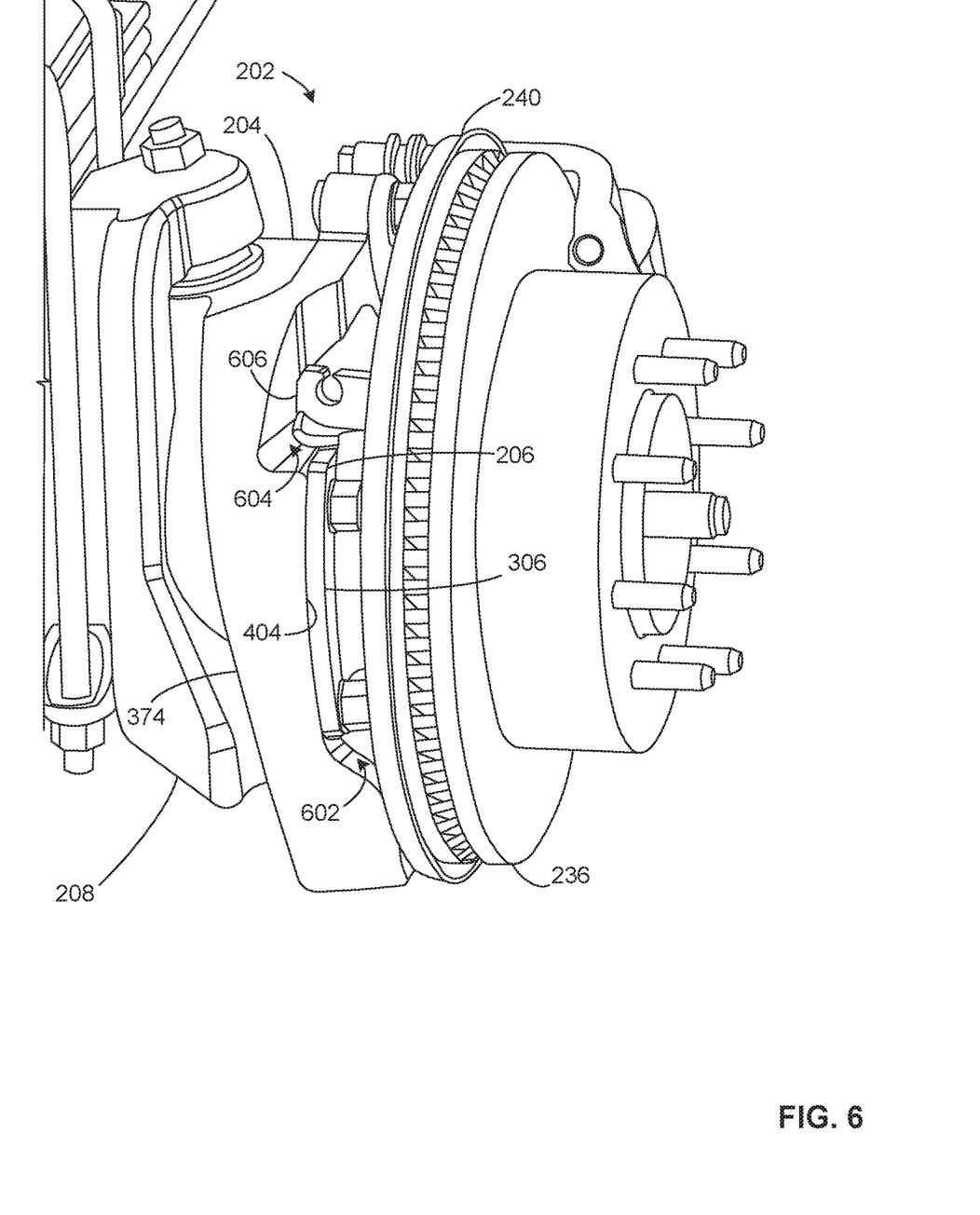
FIG. 6 is an isometric front-view of the example steerable knuckle of FIG. 2.

FIG. 6 is an isometric front-view of the example steerable knuckle 202 of FIG. 2 and shows the first portion 204 of the knuckle 202 movably coupled to the yoke 208 and the second portion 206 of the knuckle 202 removably coupled to the first portion 204. As disclosed above in connection with FIG. 4, the first portion 204 of the knuckle 202 includes a stepped profile such the first portion 204 is proximate to (e.g., spaced by 0.01 inches, 0.1 inches, 1 inch, etc. from) the dust shield 240 of the parking brake 232, engages the second portion 206 of the knuckle 202, and/or receives means for engaging the parking brake 232. In the example of FIG. 6, the second arm 374 of the first portion 204 includes the stepped profile. For example, the second arm 374 includes a first recessed area 602 at least partially defining the mating surface 404 of the first portion 204 to engage the first flange 306 of the second portion 206. Further, in some examples, the second arm 374 of the first portion 204 includes a second recessed area 604, adjacent the first recessed area 602, to receive the means for engaging the parking brake 232. While the second arm 374 of the first portion 204 is depicted having the stepped profile, in other examples, the first arm 372 may additionally or alternatively have the above disclosed stepped profile.

The means for engaging the parking brake 232 includes one or more of a cable abutment, a motor, a servo, etc. to actuate the parking braking 232 and/or provide braking to the vehicle. In the illustrated example, the second portion 206 of the knuckle 202 includes a cable abutment 606 disposed in the second recessed area 604 of the first portion 204 to receive a wire or cable (i.e., a brake wire) of the vehicle. In such examples, the wire or cable causes the parking brake 232 to engage the brake rotor 236 and/or provide braking to the vehicle (e.g., in response to a driver actuating a parking brake of the vehicle). Additionally or alternatively, in other examples, the second portion 206 of the knuckle 202 includes an electric motor disposed in the second recessed area 604 and/or operationally coupled to the second portion 206 to receive a signal or transmission wire of the vehicle, for example, to draw power from the vehicle and/or receive a command signal via a driver and/or controller of the vehicle. In such examples, the motor causes the parking brake 232 to engage the brake rotor 236 and/or provide braking to the vehicle.

Figure 7:
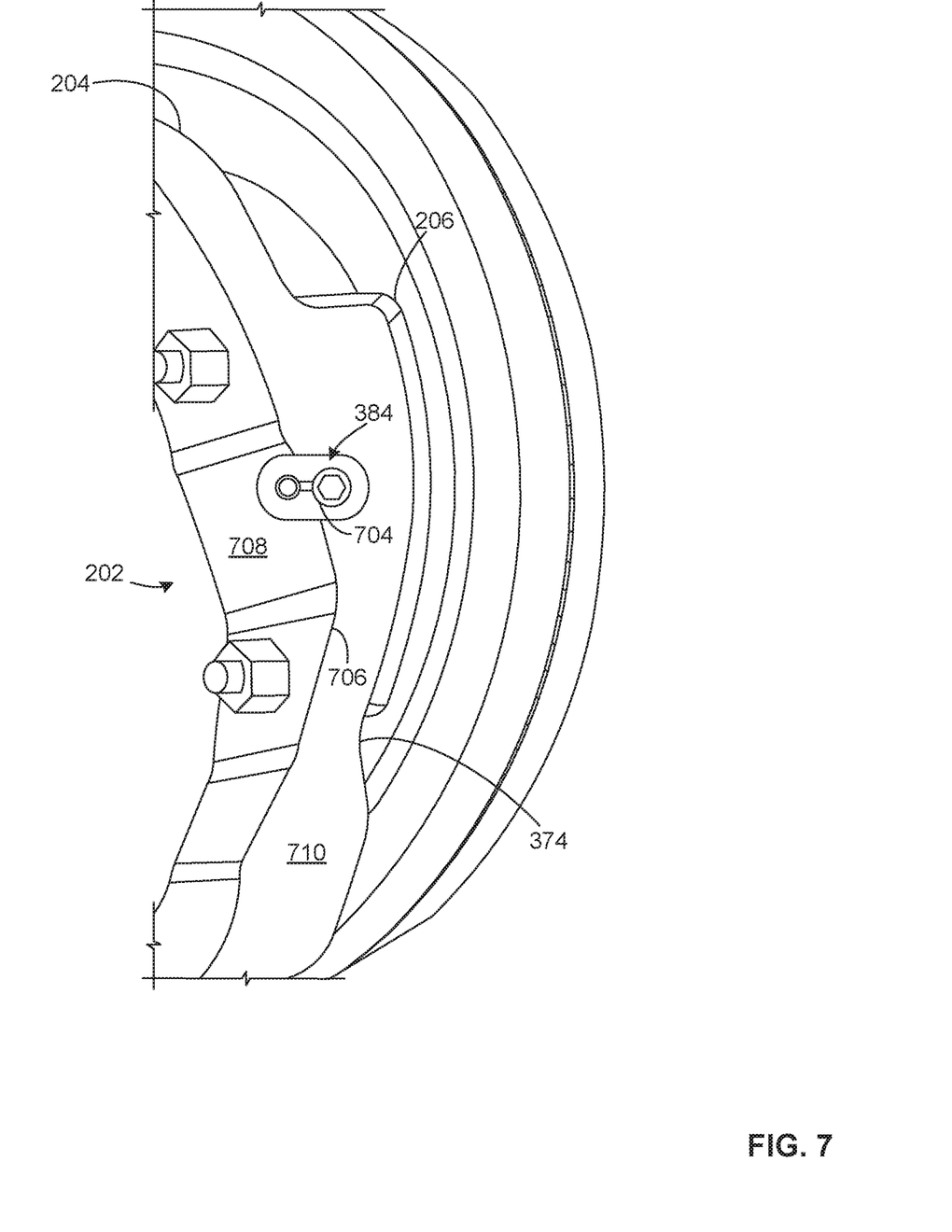
FIG. 7 is an isometric view of the example steerable knuckle of FIG. 2 and shows an example sensor.

FIG. 7 is an isometric view of the example steerable knuckle 202 of FIG. 2 and shows the second portion 206 of the knuckle 202 removably coupled to the first portion 204. As shown in FIG. 7, the first portion 204 of the knuckle includes the seventh aperture 384 extending through the first portion 204. In this example, the seventh aperture 384 is disposed on the second arm 374 of the first portion 204 and/or extends to the mating surface 404 of the first portion 204. In such examples, the sensor (e.g., a wheel speed sensor) 704 is at least partially disposed in the seventh aperture 384 proximate to a portion of the axle 222 (e.g., the stub shaft 230) and/or operationally coupled to the first portion 204 and/or the second portion 206 of the knuckle 202. In such examples, the seventh aperture 384 of the first portion 204 facilitates access to the sensor 704, for example, during vehicle service and/or manufacture.

As shown in FIG. 7, the first portion 204 of the knuckle 202 includes an edge (e.g., a chamfered edge) 706 formed by a first outer surface 708 and a second outer surface 710 of the first portion 204. In this example, the first outer surface 708 and the second outer surface 710 of the first portion 204 are substantially perpendicular relative to each other and/or at least partially define the seventh aperture 384.

Figure 8:
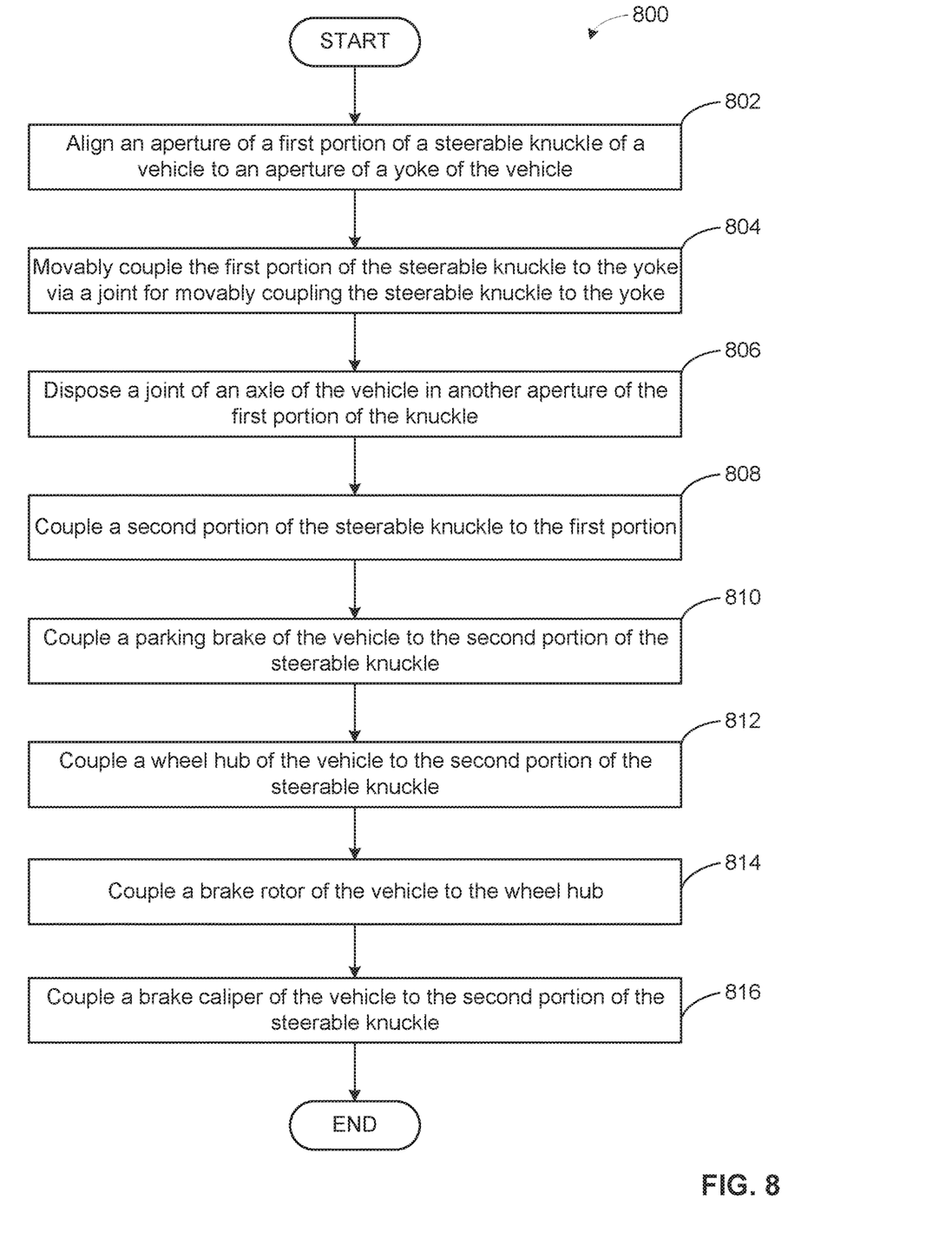
FIG. 8 is a flow diagram of an example method that can be used to implement the example axle assembly and/or the example steerable knuckle of FIGS. 2-7.

FIG. 8 is flow diagram of an example method 800 that can be used to implement the example axle assembly 200 and/or the example steerable knuckle 202 of FIGS. 2-7. The example method 800 can be implemented, for example, in the vehicle 100 of FIG. 1. The example method 800 begins by aligning an aperture of a first portion of a steerable knuckle of a vehicle to an aperture of a yoke of the vehicle (at block 802). In some examples, the first aperture 210 of the first portion 204 of the knuckle 202 of FIG. 2 is aligned to the second aperture 212 of the yoke 208, for example, such that the first aperture 210 and the second aperture 212 are substantially concentric or coaxial. In such examples, at least a portion of the first ball joint 344 may be disposed in the first aperture 210 before or after aligning the first aperture 210 to the second aperture 212. For example, the first ball stud 348 of the first ball joint 344 is secured in the first aperture 210 of the first portion 204 of the knuckle 202.

Similarly, in some examples, the third aperture 214 of the first portion 204 of the knuckle 202 is aligned to the fourth aperture 216 of the yoke 208, for example, such that the third aperture 214 and the fourth aperture 216 are substantially concentric or coaxial. As such, the yoke 208 is at least partially positioned in the fifth aperture 218 of the first portion 204 and/or between the first aperture 210 and the third aperture 214 of the first portion 204. In such examples, at least a portion of the second ball joint 350 may be disposed in the third aperture 214 before or after aligning the third aperture 214 to the fourth aperture 216. For example, the second ball stud 352 of the second ball joint 350 is secured in the third aperture 214 of the first portion 204 of the knuckle 202.

Additionally or alternatively, in some examples, a slug 366 is disposed in the fourth aperture 216 of the yoke 208 before or after aligning the third aperture 214 of the first portion 204 to the fourth aperture 216 of the yoke 208, which enables the second end 360 of the second ball joint 350 to be easily positioned and/or secured in the fourth aperture 216. In some examples, the slug 366 is positioned in the uppermost portion of the fourth aperture 216 of the yoke 208. In such examples, the first aperture 210 of the first portion 204 of the knuckle 202 is positioned below the second aperture 212 of the yoke 208 and the third aperture 214 of the first portion 204 is positioned below the fourth aperture 216 of the yoke.

The example method 800 also includes movably coupling the first portion of the steerable knuckle to the yoke via a joint for movably coupling the steerable knuckle to the yoke (at block 804). In some examples, the first portion 204 of the knuckle 202 of FIG. 2 is movably coupled to the yoke 208 via the first ball joint 344 of FIG. 3. For example, the first ball joint 344 is positioned in the first aperture 210 of the first portion 204 and the second aperture 212 of the yoke 208, and the first fastener 358 is disposed on the second end 354 of the first ball joint 344. Similarly, in some examples, the second ball joint 350 is positioned in the third aperture 214 of the first portion 204 and the fourth aperture 216 of the yoke 208, and the second fastener 364 is disposed on the second end 360 of the second ball joint 350.

The example method 800 also includes disposing a joint of an axle of the vehicle in another aperture of the first portion of the knuckle (at block 806). In some examples, the joint 220 (e.g., a universal joint) of the axle 222 of FIG. 2 is disposed in the fifth aperture 218 of the first portion 204 of the knuckle 202 such that the joint 220 is positioned adjacent and/or proximate to the first ball joint 344 and/or the second ball joint 350.

The example method 800 also includes coupling a second portion of the steerable knuckle to the first portion (at block 808). In some examples, the second portion 206 of the knuckle 202 of FIG. 2 is coupled to the first portion 204 via the means for fastening the second portion 206 to the first portion 204. For example, the first pair of apertures 318, 320 of the first flange 306 of the second portion 206 of the knuckle 202 are aligned to the respective second pair of apertures 322, 324 of the first portion 204, and at least a portion of the mating surface 404 of the first portion 204 is positioned on the first flange 306 of the second portion 206. In such examples, a bolt is disposed in one or more (e.g., each) of the apertures 318, 320, 322, 324 and/or a nut is disposed on each bolt, thereby coupling the second portion 206 of the knuckle to the first portion 204.

Similarly, in some examples, the third pair of apertures 330 of the second flange 326 of the second portion 206 of the knuckle 202 are aligned to the respective fourth pair of apertures 334, 336 of the first portion 204, and at least a portion of the mating surface 404 of the first portion 204 is positioned on the second flange 326 of the second portion 206. In such examples, a bolt is disposed in one or more (e.g., each) of the apertures 330, 334, 336 and/or a nut is disposed on each bolt, thereby coupling the second portion 206 of the knuckle to the first portion 204.

The example method 800 also includes coupling a parking brake of the vehicle to the second portion of the steerable knuckle (at block 810). In some examples, the parking brake 232 of FIG. 2 is coupled to the second portion 206 of the knuckle 202 via the mating surface 302 of the second portion 206. For example, at least a portion the dust shield 240 of the parking brake 232 is aligned to and/or positioned on the mating surface 302 of the second portion 206, and one or more of the fasteners 304 of the mating surface 302 couple the parking brake 232 and/or the dust shield 240 to the second portion 206.

The example method 800 also includes coupling a wheel hub of the vehicle to the second portion of the steerable knuckle (at block 812). In some examples, the wheel hub 234 of FIG. 2 is coupled to the second portion 206 of the knuckle 202 via the cylindrical portion 338 of the second portion 206. For example, at least a portion of the wheel hub 234 is aligned to the recesses 342 of the cylindrical portion 338 and/or positioned on the annular mating surface 340. As such, at least a portion of the wheel hub 234 is positioned in the sixth aperture 228 of the second portion 206 to receive the stub shaft 230. In such examples, the means for coupling the second portion 206 to the wheel hub 234 is disposed in one or more of the recesses 342 of the cylindrical portion 338 prior to positioning the wheel hub 234 on the second portion 206.

The example method 800 also includes coupling a brake rotor of the vehicle to the wheel hub (at block 814). In some examples, the brake rotor 236 of FIG. 2 is coupled to the wheel hub 234. For example, the brake rotor 236 is aligned to and/or positioned on the wheel hub 234.

The example method 800 also includes coupling a brake caliper of the vehicle to the second portion of the steerable knuckle (at block 816). In some examples, the brake caliper 238 of FIG. 2 is coupled to the second portion 206 of the knuckle 202 via the first flange 306 of the second portion 206. For example, at least a portion of the brake caliper 238 is positioned on one or both of the pair of bosses 310, 312 of the first flange 306 and/or aligned to one or both of the apertures 314, 316 of the bosses 310, 312. In such examples, the means for fastening the second portion 206 to the brake caliper 238 is disposed in one or both of the apertures 314, 316.

Although the axle assembly 200 and/or the steerable knuckle 202 is described with reference to the flowchart illustrated in FIG. 8, any other method of implementing the axle assembly 200 and/or the steerable knuckle 202 may alternatively be used. For example, the order of execution of the blocks of FIG. 8 may be combined and/or some of the blocks described may be changed, eliminated, or additional blocks may be added. The example method 800 shown in FIG. 8 is only one example method describing the implementation of the steerable knuckle 202. For example, the second portion 206 of the knuckle 202 may be coupled to and/or carry one or more of the parking brake 232, the dust shield 240, the wheel hub 234, the brake rotor 236, and/or the brake caliper 238 before the second portion 206 is coupled to the first portion 204.

As used herein, the terms "including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

From the foregoing, it will be appreciated that example steerable knuckle apparatus and related methods have been disclosed that provide a steerable knuckle having a first portion and a second portion. By enabling the second portion of the steerable knuckle to removably couple to the first portion, disclosed examples facilitate assembly and/or disassembly of one or more axles and/or components associated with the axle while reducing and/or eliminating problems that would have otherwise been caused by using known steerable knuckles.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a steerable knuckle for a vehicle, the knuckle having a first portion to be movably coupled to a yoke of the vehicle and a second portion removably coupled to the first portion, the second portion to receive a wheel hub of the vehicle;
   a drum in hat (DIH) brake removably coupled to the second portion such that the first portion, the second portion and the DIH brake are aligned about an axle of the vehicle; and
   a first aperture disposed on the first portion to receive a first joint for movably coupling the knuckle to the yoke, the first joint including a ball joint, a ball stud of the ball joint extending through the first aperture to expose an end of the ball stud.

2. The apparatus of claim 1, wherein the second portion of the knuckle includes a flange portion to receive a brake caliper.

3. The apparatus of claim 1, wherein the first portion includes an arm extending radially outward relative to the first aperture to engage means for steering the vehicle.

4. The apparatus of claim 1, wherein the first portion of the knuckle includes a second aperture adjacent the first aperture to receive a second joint, the second joint coupled to the axle of the vehicle and at least partially disposed in the second aperture.

5. The apparatus of claim 4, wherein the second aperture is oblong.

6. The apparatus of claim 4, wherein the first joint is at least partially disposed in the second aperture.

7. The apparatus of claim 4, wherein the first portion of the knuckle includes a third aperture adjacent the second aperture to receive a third joint for movably coupling the knuckle to the yoke, the second aperture positioned between the first aperture and the third aperture.

8. The apparatus of claim 7, wherein the third joint is external to the second aperture.

9. The apparatus of claim 7, wherein the yoke is at least partially disposed between the first aperture and the third aperture.

10. An apparatus comprising:
    a vehicle having a steerable knuckle, a first portion of the knuckle movably coupled a yoke of the vehicle and a second portion of the knuckle removably coupled to the first portion, wherein the first portion of the knuckle includes a first arm, a second arm, and a first aperture to receive a first joint for movably coupling the knuckle to the yoke, the first arm and the second arm extending away from the first aperture to engage the second portion of the knuckle, the second portion removably coupled to a drum in hat (DIH) brake such that the first portion, the second portion and the DIH brake are aligned about an axle of the vehicle, the first joint at least partially disposed between the first arm and the second arm.

11. The apparatus of claim 10, wherein the first arm and the second arm at least partially surround a joint of the axle of the vehicle adjacent the first aperture.

12. The apparatus of claim 10, wherein the first arm and the second arm extend away from the first aperture to define a second aperture spaced from the first aperture, the second aperture to receive a second joint for movably coupling the knuckle to the yoke.

13. The apparatus of claim 12, wherein an axis of the first aperture is substantially parallel relative to an axis of the second aperture.

14. An apparatus comprising:
    a steerable knuckle for a vehicle, the knuckle having a first portion to be movably coupled to a yoke of the vehicle and a second portion removably coupled to the first portion, the second portion to receive a wheel hub of the vehicle;
    a drum in hat (DIH) brake removably coupled to the second portion such that the first portion, the second portion and the DIH brake are aligned about an axle of the vehicle; and
    a first aperture disposed on the first portion to receive a first joint for movably coupling the knuckle to the yoke, the first portion of the knuckle including a second aperture adjacent the first aperture to receive a second joint, the second joint coupled to the axle of the vehicle and at least partially disposed in the second aperture, the first joint at least partially disposed in the second aperture.

15. The apparatus of claim 14, wherein the first joint includes a ball joint.

16. The apparatus of claim 15, wherein a ball stud of the ball joint extends through the first aperture to expose an end of the ball stud.

17. The apparatus of claim 14, wherein the second portion of the knuckle includes a flange portion to receive a brake caliper.

18. The apparatus of claim 14, wherein the first portion includes an arm extending radially outward relative to the first aperture to engage means for steering the vehicle.

19. The apparatus of claim 14, wherein the second aperture is oblong.

\* \* \* \* \*